Dec. 29, 1964  B. K. KAVECKAS ETAL  3,163,045
THERMALLY RESPONSIVE POWER MEANS
Filed Nov. 23, 1962
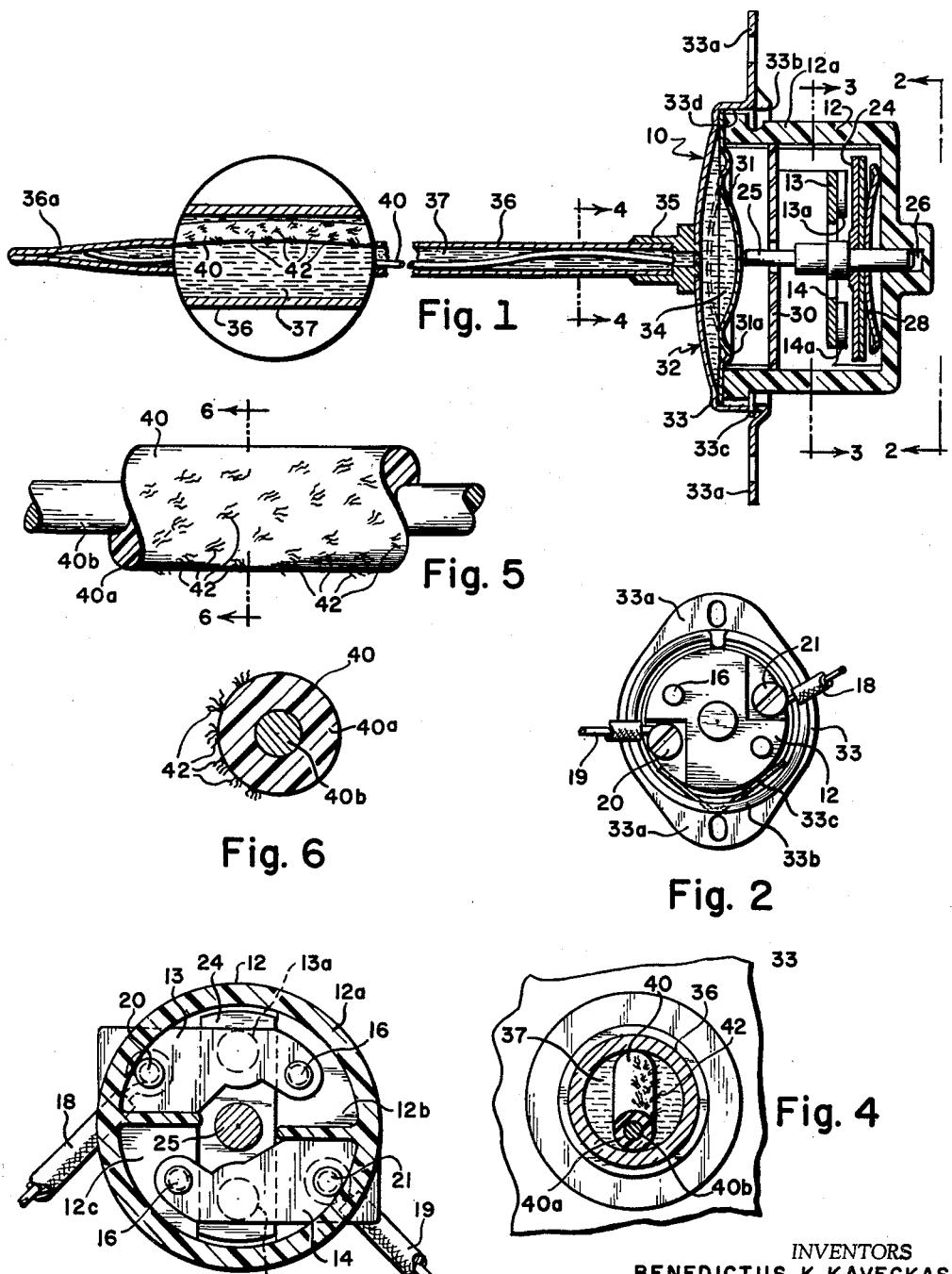
INVENTORS
BENEDICTUS K. KAVECKAS
ESTEL C. RANEY
BY
ATTORNEY United States Patent Office 3,163,045
Patented Dec. 29, 1964

3,163,045
THERMALLY RESPONSIVE POWER MEANS
Benedictus K. Kaveckas, Roselle, N.J., and Estel C. Raney, Fort Lauderdale, Fla., assignors to The Wilcolator Company, Elizabeth, N.J., a corporation of Delaware
Filed Nov. 23, 1962, Ser. No. 239,843
27 Claims. (Cl. 73—368.2)

This invention relates to improvements in thermally responsive power means of the type comprising a liquid containing expansible chamber having a movable wall which is distended when any of the liquid is vaporized by an increase in temperature thereof. The movable wall may be utilized to actuate a control device such as an electric switch or valve.

Thermally responsive power means of the general type described are known, but prior to our invention the liquid therein would not vaporize consistently at predetermined temperatures throughout a considerable passage of time. Experience has shown that minute quantities of gas in the liquid will cause the liquid to vaporize at predetermined temperatures; however, this gas eventually separates from the liquid and the remaining pure liquid will not vaporize unless it is heated to an unpredictable temperature appreciably above that at which the impure liquid vaporizes.

An object of the present invention is the provision of a thermally responsive power means of the type described in which the volatile liquid vaporizes consistently at a definite predetermined temperature. In carrying out the invention material is included within the chamber so as to be in contact with the vaporizable liquid, the material being of a character which is non-wettable by at least one constituent of the liquid in the power means. In a preferred form of the invention, the liquid includes water and the non-wettable material is polytetrafluoroethylene, known commercially as "Teflon." Preferably the polytetrafluoroethylene is in a form to present a plurality of sharp edges.

Another object of this invention is the provision of an improved power means of the foregoing character wherein the expansible chamber includes a substantial length of a relatively small diameter tubular sensing member containing at least a portion of the liquid fill and having the non-wettable material in the interior thereof and distributed throughout the length of the tubular member. For example, the liquid may include water and the non-wettable material may be in the form of a roughened strand of wire of polytetrafluoroethylene plastic in the tube and extending throughout its length, whereby the liquid in all sections of the tube is in contact with the non-wettable material so that when any relatively short zone or segment of the tubular member is heated to raise the temperature of the liquid in the segment to a predetermined degree, the portion of the liquid in this segment will vaporize and cause a substantial increase in pressure and distend the movable wall of the chamber although the major portion of the liquid remains unvaporized.

Yet another object of this invention is the provision of an improved control device comprising a switch, valve, or the like operable by the movable wall of an expansible chamber connected to a tubular temperature sensing member containing a liquid comprising water or a mixture of water and another volatile liquid, such as ethylene glycol or methyl alcohol, and having a strand of roughened, non-wettable material disposed in the tubular member and extending substantially throughout the length thereof.

Other objects and advantages of this invention will become apparent from the following detailed description of a presently preferred embodiment thereof, taken in conjunction with the accompanying sheet of drawing forming a part of this specification and in which FIG. 1 is a longitudinal sectional view of a control device, embodying the present invention, with a portion of the tubular member thereof shown in a magnified scale;

FIG. 2 is an end view of the device of FIG. 1 taken along line 2—2 on a slightly reduced scale;

FIG. 3 is a sectional view taken along line 3—3 of FIG. 1;

FIG. 4 is a sectional view on an enlarged scale taken along line 4—4 of FIG. 1;

FIG. 5 is a fragmentary view of a portion of the control device of FIG. 1 on an enlarged scale; and FIG. 6 is a sectional view taken along line 6—6 of FIG. 1.

In the form of the invention shown in the drawings and described hereinafter, the invention is embodied in a thermally responsive control switch device 10, although it will be understood that the invention may be embodied in devices having other control functions such as a thermally responsive control valve, or the like.

Referring to FIGS. 1, 2, and 3, control device 10 is seen to comprise a cylindrical or cup-shaped housing 12 formed of a suitable insulating material such as "Bakelite." A pair of stationary contact members 13 and 14 extend through the side wall 12a of housing 12 and having their inner ends riveted to bosses 12b and 12c as by rivets 16. The outer ends of contact member 13 and 14 serve as switch terminals for the connection of wires such as 18 and 19 secured thereto by binding screws 20 and 21. A movable bridging contact 24 is mounted for movement with an axially movable operating rod 25 which is slidably received in a guide bore 26 formed in housing 12. Bridging contact 24 is normally biased in bridging engagement with contacts 13a and 14a, on contact members 13 and 14 respectively, by a bowed leaf spring 28. Operating rod 25 extends through an opening in a guide disc 30 and is adapted to be moved by the action of a flexible diaphragm 31 forming part of a thermally responsive power means generally indicated at 32.

Power means 32 comprises a cup-shaped member 33 having mounting ears 33a, and in which the open end of housing 12 is received and retained by an inwardly directed tab 33b and a spring clip 33c which projects through one wall of cup 33. Diaphragm 31 is welded about its peripheral edge to the bottom of cup-shaped member 33 adjacent wall 33d thereof, thereby forming a narrow chamber 34. A nipple 35 is spot welded or brazed in a central opening of member 33 and receives one end of a capillary tube 36. The opposite end 36a of the tube is sealed and the tube and chamber 34 contain a liquid fill 37 comprising a mixture of water and volatile liquid such as methyl alcohol, which liquid fill will be discussed more fully hereinafter.

Diaphragm 31 is formed with convolutions 31a embossed therein which cause it to have an over-center snap action when flexed, and if unrestrained would tend to remain in the position of FIG. 1 in which rod 25 is moved to the right and the switch contacts are separated. Chamber 34 and tube 36 are, however, charged with liquid fill 37 at a pressure substantially less than the ambient atmospheric pressure acting on diaphragm 31, so that at temperatures less than the boiling point of the liquid the diaphragm is held in the dotted line position of FIG. 1, with the switch contacts closed. It will be recognized that either upon boiling of the liquid fill 37 or upon a leak developing in the system, the pressure in chamber 34 will increase and permit diaphragm 31 to snap to its full line position and open the contacts so as to deenergize a circuit connected theerto. Thus, the control device 10 is not only adapted to actuate the switch contacts upon predetermined increases in temperature along the tubular member 36, but also incorporates a fail-safe feature effecting opening of the contacts in the event of loss of fluid-tight integrity in the thermally responsive power means 32. In the present example, the diaphragm 31 snaps out upon a decrease of vacuum in the chamber 34 to within a range of 3 to 8 inches of mercury, and will snap in or "reset" when the vacuum is increased to 13 to 18 inches of mercury.

Included also in tube 36 is a wire or strand 40 which is somewhat smaller than the inside diameter of the tube, and is preferably formed of polytetrafluoroethylene plastic either in solid form, or as a coating 40a on a stainless steel wire core 40b, as shown in FIG. 5. Wire or strand 40 extends substantially the full length of the tube 36 and the surface of the plastic is roughened so as to present a plurality of hair-like projections 42 formed, for example, by abrasion or scuffing of the plastic.

The steel wire core 40b stiffens the strand 40 for easy insertion into long capillary tubes, some of which exceed ten feet in length. In the present example the strand 40 is formed by wrapping "Teflon" tape (.006 inch thick) around the wire core 40b (.010 inch diameter) and fusing the tape into an integral covering. At least 25% of the surface of the covering is then mechanically abraded to provide the projections 42. This strand is then inserted in a capillary tube of .048 inch diameter.

The liquid fill in this example comprises, as mentioned previously, a mixture of water and methyl alcohol, with water constituting 65% of the mixture and methyl alcohol constituting 35% of the mixture. This mixture, when confined at the previously mentioned pressure in the capillary tube 36 with the "Teflon" strand 40, will vaporize or boil at 165° F. thereby flexing diaphragm 31 for operation of the switch device.

Mixtures of water and other substances such as methyl alcohol or ethylene glycol may be used in different proportion to provide actuation at other temperatures. For example, water mixtures containing the listed percentages of ethylene glycol or methyl alcohol will provide response at the following temperatures.

190° F.—6% methyl alcohol
210° F.—51% ethylene glycol
240° F.—82% ethylene glycol
260° F.—89% ethylene glycol
285° F.—94% ethylene glycol In addition, extensive experimentation has shown that certain pure liquids which have been subject to the problem of unpredictable superheating heretofore may be used as the fill and will provide reproducible results repeatedly when in the presence of the "Teflon." For example, pure distilled water may be used as the fill, and under the mentioned pressures will result in an operating temperature of 205° F. Similarly, diethylene glycol will result in an operating temperature of 473° F., and triethylene glycol will result in an operating temperature of 550° F.

While it is not fully understood why the use of the above liquid fill materials in the presence of abraded "Teflon" has been successful in overcoming super-heating of the liquid fill when confined in a capillary tube, for example, it is believed that the resistance of "Teflon" to wetting by water or other vaporizing liquids creates a surface condition between the liquid and the strand which permits vapor bubbles to readily form before the boiling point is actually reached. Thus, when the boiling point is reached, there are in existence vapor filled interfaces at which the boiling can occur.

From the foregoing detailed description, it will be recognized that this invention has provided an improved thermally responsive device which is actuable by attainment of a predetermined temperature at any given length along the temperature sensing capillary tube and which is not subject to averaging of the temperatures therealong. It will also be recognized that the use of a mixture of water and other volatile liquids in the presence of an abraded strand of "Teflon" eliminates any likelihood of superheating and failure of the control device to be actuated.

Although the invention has been described in considerable detail with reference to a preferred form of control device embodying the invention, it is understood that the invention is not limited thereto, but rather the invention includes all those substitutions, modifications, and changes as are reasonably embraced by the scope of the claims hereof.

Having thus described our invention, we claim:
1. A thermally responsive power means comprising:
 (a) an expansible hollow element,
 (b) a volatile liquid in said element, and
 (c) a material in said element having a non-wettable surface in contact with said liquid.
2. A thermally responsive power means as defined in claim 1 in which said material is polytetrafluoroethylene having hair-like projections from a surface thereof.
3. A thermally responsive power means as defined in claim 1 and wherein said material comprises polytetrafluoroethylene.
4. A thermally responsive power means as defined in claim 3 and wherein said polytetrafluoroethylene presents sharp edges.
5. A thermally responsive power means as defined in claim 3 and wherein said liquid comprises water.
6. A thermally responsive power means as defined in claim 5 wherein said liquid comprises a mixture of water and ethylene glycol.
7. A thermally responsive power means as defined in claim 5 wherein said liquid comprises a mixture of methyl alcohol and water.
8. Thermally responsive power means comprising:
 (a) an expansible element,
 (b) a mixture of water and a volatile liquid in said element, and
 (c) a material in said element and having a non-wettable surface in contact with said mixture.
9. A thermally responsive power means as defined in claim 8 and wherein said surface presents a plurality of sharp edges.
10. A thermally responsive power means as defined in claim 8 and wherein said material comprises polytetrafluoroethylene.
11. Thermally responsive power means of the character described comprising:
 (a) an expansible element,
 (b) a tube communicating at one end with the interior of said expansible element and sealed at the other end,
 (c) said expansible element and said tube containing a volatile liquid, and
 (d) a material disposed in said tube along a major portion thereof, said material having a surface which is non-wettable by said liquid.
12. A thermally responsive power means as defined in claim 11 wherein said material comprises a wire coated with polytetrafluoroethylene having a plurality of hair-like projections from the surface thereof.
13. A thermally responsive power means as defined in claim 11 in which said material has hair-like projections from a surface thereof.
14. A thermally responsive power means as defined in claim 11 and wherein said volatile liquid comprises ethylene glycol.
15. A thermally responsive power means as defined in claim 11 and wherein said volatile liquid comprises methyl alcohol.
16. A thermally responsive power means as defined in claim 11 and wherein said volatile liquid comprises water.
17. A thermally responsive power means as defined in claim 11 and wherein said material is in the form of a strand.

18. A thermally responsive power means as defined in claim 17 and wherein said strand comprises a surface of polytetrafluoroethylene.

19. A thermally responsive power means comprising:
(a) an expansible element,
(b) a tube communicating at one end with the interior of said element and sealed at the other end,
(c) a strand disposed in said tube along a major portion thereof,
(d) said expansible member and said tube being filled with a mixture of water and another substance, and
(e) said strand presenting a rough surface of non-wettable material.

20. A power means as defined in claim 19 and wherein said non-wettable material is polytetrafluoroethylene.

21. A power means as defined in claim 20 and wherein said strand comprises a metal core covered with said polytetrafluoroethylene.

22. A power means as defined in claim 19 and wherein said other substance comprises ethylene glycol.

23. A power means as defined in claim 19 and wherein said other substance comprises methyl alcohol.

24. A thermally responsive power means as defined in claim 19 wherein said tube is filled with a mixture of water and another volatile liquid.

25. A thermally responsive control device comprising:
(a) a control member operable through a plurality of control positions,
(b) an expansible element connected to said control member for operation thereof,
(c) a tube communicating at one end with the interior of said element and sealed at the other end,
(d) a strand disposed in said tube along a major portion thereof,
(e) said expansible member and said tube being filled with a volatile liquid, and
(f) said strand presenting a rough surface of material which is non-wettable by a constituent of said liquid.

26. A thermally responsive power device for actuation of control means at a predetermined temperature or upon failure of the device, said device comprising:
(a) a hollow member having a normal distended position and adapted to be held in a contracted position by a predetermined differential in pressure between the inside and outside thereof, said hollow member being adapted to be resiliently urged to said distended portion upon loss of said predetermined differential,
(b) a vaporizeable liquid confined in said hollow member so as to maintain said predetermined differential at temperatures below said predetermined temperature and to boil and permit distention of said hollow member at said predetermined temperature,
(c) and a material having a non-wettable surface in contact with said liquid whereby bubbles form in said liquid below said predetermined temperature and provide interfaces through which the liquid can boil at said predetermined temperature.

27. A thermally responsive device as defined in claim 25 and comprising a tubular sensing element communicating with the interior of said hollow member and containing said liquid, and said material comprising a strand of polytetrafluoroethylene extending along a major portion of the length of said sensing element.

No references cited.